May 15, 1956   G. E. OTT   2,745,582
LEAK DETECTING MEANS
Filed Aug. 26, 1953

Inventor:
George E. Ott,
by Vernet C. Kauffman
His Attorney.

– – –

United States Patent Office 2,745,582
Patented May 15, 1956

2,745,582

LEAK DETECTING MEANS

George E. Ott, Willoughby, Ohio, assignor to General Electric Company, a New York corporation Application August 26, 1953, Serial No. 376,703

2 Claims. (Cl. 226—20.4)

My invention relates generally to automatic apparatus for exhausting the envelopes or containers of lamps, discharge devices and other electrical devices, and more particularly to means for automatically detecting and isolating leaking electrical devices introduced into such exhaust apparatus.

One object of my invention is to provide sensitive means for automatically detecting leaking devices during a moment of connection thereto in exhaust machines and, accordingly, under conditions where an absolutely constant exhaust source is not available. The high rate of exhaust in large, high speed exhausting machines causes fluctuations in exhaust lines which have rendered false determinations in prior art leak detecting means and which are balanced out in apparatus comprising my invention so as to be ineffective in determining leaking conditions.

Another object of my invention is to provide a sensitive leak detector in combination with an automatic high-speed exhausting machine and means whereby a leaking electrical device is isolated from the exhausting system of the machine to prevent air and contamination from entering the system.

Apparatus embodying my invention provides for the electrical device and two chambers of a pressure responsive means to be momentarily connected to an exhaust source so as to be brought to a common pressure. Immediately after the exhaust source is disconnected, said apparatus seals one of the chambers of the pressure responsive means so as to maintain the original common pressure in said chamber and so as to cause any leakage of air into the electrical device and change in pressure in the other chamber to effect operation of the pressure responsive means. In one application of the invention, the electrical device is held in an exhaust port at the periphery of a turret and is connected to exhaust sources and other means, in turn, by the displacement of portions of a valve located below a center portion of said turret and in part moved thereby. The leak detecting means is preferably associated with the valve in a manner whereby the electrical device is tested for leaks almost immediately after being inserted in the exhaust port and whereby it can be isolated from the valving means prior to any appreciable period of connection to said exhaust means. Accordingly, any air leaking through the device is kept from unnecessarily contaminating the exhaust source.

Other objects and features of my invention will appear from the following description of species thereof and from the drawing.

Figure 1:
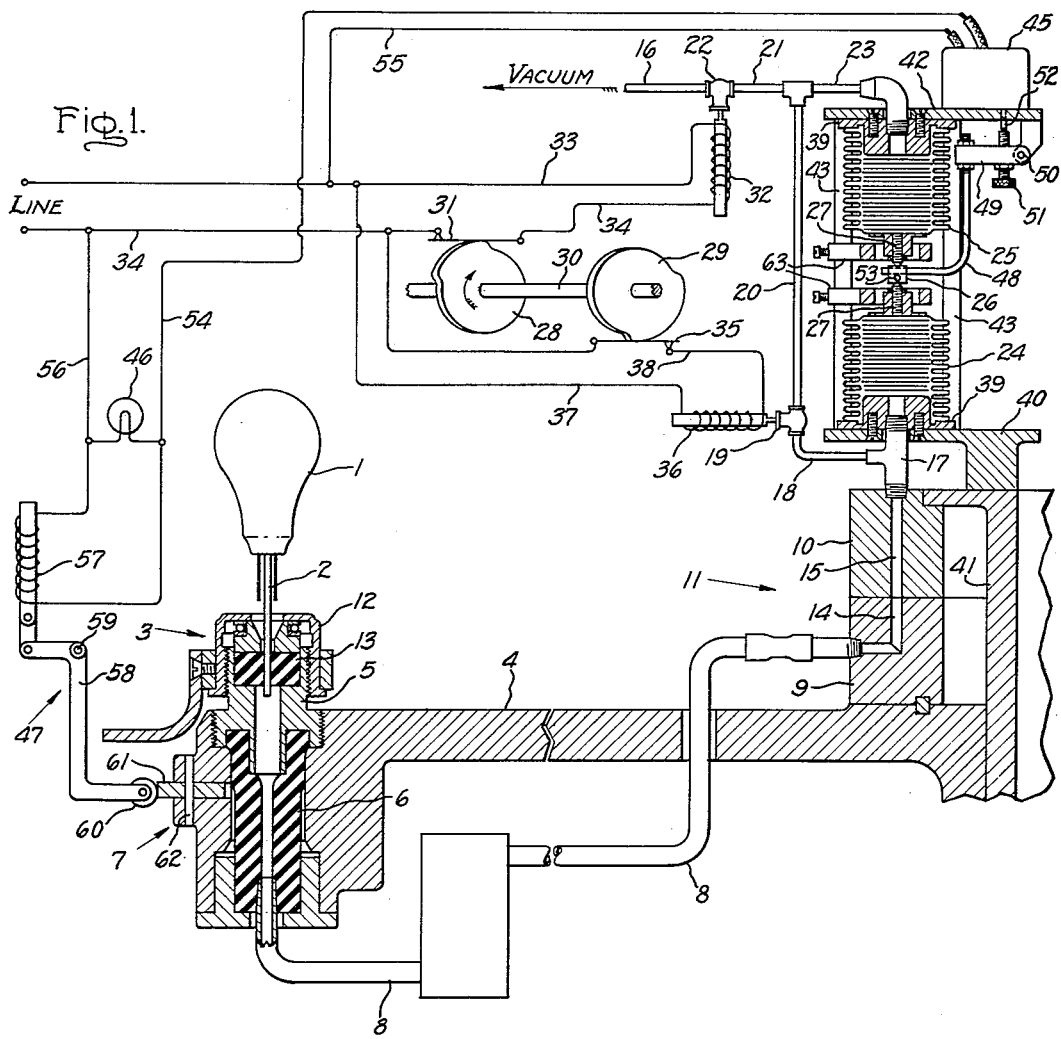
Fig. 1 is a diagrammatic sectional view through a portion of an exhaust machine including the leak detecting means of my invention and with the electrical operating means of the leak detecting means superimposed thereon.

The incandescent lamp bulb 1 in association with the exhausting means appearing in Fig. 1 is connected by its exhaust tube 2 to one of a plurality of ports 3 located about the rim of a turret 4 in the manner of conventional forms of exhaust machines, for instance that disclosed in Patent 2,265,381 to Malloy, dated December 9, 1941. The exhausting of the lamp 1 is effected through the body 5 of the port 3, the rubber tube 6 of the pinch clamp or valve 7 and the pipe line 8 in accordance with connections made through rotating and stationary sections 9 and 10 of a ring-shaped rotary valve 11 located about the axis of rotation of the turret 4. The usual cycle of operation of exhausting machines provides for an indexing motion of the turret 4 whereby successive steps in the cycle are produced during the moments that specific portions of the valve sections 9 and 10 register with each other. The construction of the rotary valve 11 is such that the lamp 1 is almost immediately advanced to a test position or station where it is connected to the leak detecting means of this invention. The lamp 1 is at that time sealed to the body 5 of the port 3 by the pressure of the cap 12 against the gasket rubber 13 and maintains a direct connection through the then open pinch clamp 7 and the pipe line 8 to the passage 14 in the rotating section 9 of the valve 11.

The leak detecting operation is initiated in timed relation to the advance of the lamp 1 and port 3 to the station shown and occurs with the advance of the passage 14 in the rotary valve section 9 to register with the passage 15 in the stationary valve section 10. At that particular moment, the lamp 1 is drawn on by the factory exhaust system inasmuch as a communicating passage is then maintained from passage 15 to the factory exhaust branch 16 through the T-pipe connection 17, pipe 18, valve 19, pipes 20 and 21 and valve 22. The T-pipe connection 17 and the pipe line 23 also cause the opposed bellows 24 and 25, respectively, to be exhausted to the same degree as the lamp 1 and for that reason cause the connection block 26 located between said bellows 24 and 25 on studs 27 extending from the opposed ends thereof to be maintained at a mean position. These connections are only maintained long enough to bring the lamp 1 and both bellows 24 and 25 to the same pressure.

The next step in the operation of the leak detector means occurs when the factory exhaust branch 16 is sealed from all parts of said means by the operation of the valve 22, and the bellows 24 and the lamp 1 are sealed off from the bellows 25 by operation of the valve 19. These operations, which are effected by the rotation of the cams 28 and 29 on the main cam shaft 30 of the exhaust machine, cause the bellows 25 to hold the original exhaust pressure whereas the bellows 24 and the connected exhaust lines to the lamp 1 are subject to variation by any air leaking into the lamp 1. The interval at which the valves 19 and 22 are closed is timed with the operation of the exhaust machine as a whole and occurs at the same time in each cycle of operation thereof inasmuch as the main cam shaft 30 makes one revolution during the advance and arrangement of the port 3 at the station shown. As diagrammatically illustrated in the drawing, the cam 28 causes the switch 31 to close so that the solenoid 32 of the valve 22 is connected through the leads 33 and 34 to a main source of current and the cam 29 causes the switch 35 to close so that the solenoid 36 of the valve 19 is connected through the leads 37, 33 and 38, 34 to said main source of current.

If the lamp 1 does not leak and cause the pressure within the exhaust line 8 and bellows 24 to increase, no other operations will occur until the lamp 1 and exhaust port 3 are about to be indexed away from the station shown. On the other hand, a leaking lamp 1 causes an increased pressure in the bellows 24 with the result that it expands toward the other bellows 25, which still remains in the original exhausted condition, and a relative movement occurs in the connection block 26 located therebetween. The response effected by the movement of the connection block 26 is directly proportional to the leak in every instance in that both bellows 24 and 25 and the lamp 1 were originally exhausted from the same source and at the same time, and in that the fluctuations occurring in the exhaust source are balanced out by the bellows arrangement and are accordingly of no consequence. The motions of the bellows 24 and 25 always appear in the connection block 26 as both bellows 24 and 25 are mounted upon stationary members through the base plates 39 on their outer or remote ends. The bellows 24 is mounted directly upon the bracket 40 which is attached to the stationary center column 41 of the machine, while the bellows 25 is mounted upon a plate 42 carried upon posts 43 extending upward from the bracket 40.

The final step in the leak detecting operation occurs when the leak has caused the connection block 26 to be displaced sufficiently to operate the switch 45 and, through the making of a circuit therethrough, causes the warning lamp 46 and the pinch clamp closing means 47 to operate. This latter operation causes the rubber tube 6 of the pinch clamp 7 to be squeezed to an extent to completely close the opening therethrough and seals off the leaking lamp 1 so that air and contamination are prevented from entering the exhaust system during the time the lamp 1 is advanced through the remaining steps of the exhaust (and gas filling) operation.

Actuation of the switch 45, which is a totally enclosed type, occurs when the movement of the connection block 26 causes an arm comprised of the rod 48 and the bar 49 to be turned about the pin 50 sufficiently to press the adjusting screw 51 inward against the control pin 52 of said switch 45. A laterally extending pin 53 on the connection block 26 provides the means of transferring the motion thereof to the rod 48.

The circuit controlled by the switch 45 comprises the leads 54 and 55 (lead 55 providing the connection to one side 33 of the line) and the lead 56 which permanently connects the opposite side 34 of the line to the warning light 46 and the actuating solenoid 57 of the pinch clamp closing means 47. The making of the circuit by the switch 45 causes the actuating solenoid 57 to turn the bell crank 58 in a counterclockwise direction about the stationary pin 59 so that the roller 60 engages the cam 61 of the pinch clamp 7 and rotates it about the pin 62 in a manner to squeeze the tube 6. The pinch clamp 7, which is a type used generally in exhaust machines, maintains this closed position throughout the following steps in the exhaust cycle without the continued pressure of the bell crank 58 because the expansion pressure of the tube 6 is almost directly toward the pin 62 and does not turn the cam 61 out of place. Accordingly, the lamp 1 and exhaust port 3 are sealed from the line 8 which is automatically readied for the next cycle of operation by the exhaust steps which follow. The bell crank 58 does not interfere with the parts of the exhaust port 3 when the lamp 1 and port 3 are advanced beyond the station shown, and immediately returns to the retracted position when the pressure within the bellows 24 and 25 is balanced by the opening of the valves 19 and 22 under control of the cams 29 and 28, respectively, at that time. This latter operation also prepares the leak detecting means for the advance of another lamp and port into association therewith.

Means are also provided in the leak detecting means for preventing overexpansion and injury to the bellows 24 and 25 should the valves 19 and 22 and pinch clamp 7 fail to operate properly, said means being in the form of the stationary collars 63 on the post 43 at positions to block excessive expansion of said bellows 24 and 25.

Figure 2:
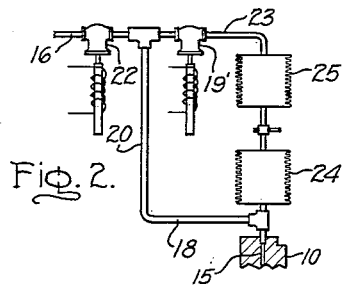
Fig. 2 is a diagram of a portion of modified leak detecting means comprising my invention.

The modification of the leak detecting means appearing in Fig. 2 differs from that just described in that a valve 19' is arranged in an alternate manner whereby its operation can control only the pipe line 23 leading to the bellows 25 and is independent of the exhaust line 18, 20 between the branch 16 of the exhaust source and the line 8 to the port 3. This arrangement permits the line 8 to be exhausted prior to the connection of the reference bellows 25 to said source when the cam 28 is modified in a manner to cause the valve 22 to be opened prior to valve 19'. The length of time for the valves 19 (or 19') and 22 to remain open in either leak detector means is such that valve 19 (or 19') closes very soon after valve 22 is closed and is such that the length of time the lamp 1 and port 3 are connected in the test arrangement is as long as possible.

While I have described a preferred embodiment of my invention, I do not wish to be limited to the exact structure shown, as it will be understood that many modifications of the precise manner by which my invention is carried into effect may be made without departing from the scope of appended claims.

What I claim as new and desire to secure by Letters Patent of the United States is:

1. An exhaust machine comprising a turret carrying an exhaust port for receiving the exhaust tube of a device to be evacuated, a port valve in the exhaust connection to said port and having an operating member extending therefrom, electromagnetic actuating means for said operating member, leak detector means comprising a pair of chambers and including a pressure responsive movable structure, conduit means connecting one of said chambers with said exhaust port, another conduit connecting the other chamber with a vacuum source, and still another conduit interconnecting said chambers, a normally open first valve in the conduit leading to said vacuum source and located to isolate the vacuum source from both said chambers, a normally open second valve located in the conduit interconnecting said chambers to isolate said one chamber and the exhaust port from said other chamber, means operable to close said first and second valves substantially simultaneously, and electrical means controlled by movement of said movable structure for controlling actuation of said electromagnetic actuating means to close said port valve in the event of increased pressure in said one chamber due to a leak in the device carried by said port while both said first and second valves remain closed.

2. In combination with an exhaust port for receiving the exhaust tube of a device to be evacuated, leak detector means comprising a pair of chambers and including a pressure responsive movable structure, conduit means connecting one of said chambers with said exhaust port, another conduit connecting the other chamber with a vacuum source, and still another conduit interconnecting said chambers, a normally open first valve in the conduit leading to said vacuum source and located to isolate the vacuum source from both said chambers, a normally open second valve located in the conduit interconnecting said chambers to isolate said one chamber and the exhaust port from said other chamber, means operable to close said first and second valves substantially simultaneously, and electrical means controlled by movement of said movable structure for providing an indication thereof in the event of increased pressure in said one chamber due to a leak in the device carried by said port while both said first and second valves remain closed.

References Cited in the file of this patent

UNITED STATES PATENTS

| | | |
|---|---|---|
| 2,029,085 | Sussin | Jan. 28, 1936 |
| 2,254,905 | Mullen | Sept. 2, 1941 |